US009756323B2

(12) United States Patent
Yu et al.

(10) Patent No.: US 9,756,323 B2
(45) Date of Patent: Sep. 5, 2017

(54) VIDEO QUALITY OBJECTIVE ASSESSMENT METHOD BASED ON SPATIOTEMPORAL DOMAIN STRUCTURE

(71) Applicant: Ningbo University, Ningbo, Zhejiang (CN)

(72) Inventors: Mei Yu, Zhejiang (CN); Yaqi Lv, Zhejiang (CN); Fen Chen, Zhejiang (CN); Shanshan Liu, Zhejiang (CN)

(73) Assignee: Ningbo University, Ningbo, Zhejiang (CN)

( * ) Notice: Subject to any disclaimer, the term of this patent is extended or adjusted under 35 U.S.C. 154(b) by 0 days.

(21) Appl. No.: 15/214,456

(22) Filed: Jul. 20, 2016

(65) Prior Publication Data

US 2016/0330439 A1    Nov. 10, 2016

(30) Foreign Application Priority Data

May 27, 2016 (CN) .......................... 2016 1 0367702

(51) Int. Cl.
*H04N 17/02* (2006.01)
*H04N 19/154* (2014.01)
*H04N 19/89* (2014.01)

(52) U.S. Cl.
CPC ........... *H04N 17/02* (2013.01); *H04N 19/154* (2014.11); *H04N 19/89* (2014.11)

(58) Field of Classification Search
CPC ...... H04N 17/02; H04N 19/154; H04N 19/89; H04N 19/53
See application file for complete search history.

(56) References Cited

PUBLICATIONS

Winkler, Stefan. "Issues in vision modeling for perceptual video quality assessment." Signal processing 78.2 (1999): 231-252.*

* cited by examiner

*Primary Examiner* — Andrew Moyer
*Assistant Examiner* — Menatoallah Youssef

(57) ABSTRACT

A video quality objective assessment method based on a spatiotemporal domain structure firstly combines a spatiotemporal domain gradient magnitude and color information for calculating a spatiotemporal domain local similarity, and then uses variance fusion for spatial domain fusion. The spatiotemporal domain local similarity is fused into frame-level objective quality value, and then a temporal domain fusion model is established by simulating three important global temporal effects, which are a smoothing effect, an asymmetric track effects and a recency effect, of a human visual system. Finally, the objective quality values of the distorted video sequence are obtained. By modeling the human visual temporal domain effect, the temporal domain weighting method of the present invention is able to accurately and efficiently evaluate the objective quality of the distorted video.

3 Claims, 2 Drawing Sheets

$$\mathbf{F}_x = \begin{bmatrix} \frac{1}{9} & \frac{1}{9} & \frac{1}{9} \\ 0 & 0 & 0 \\ -\frac{1}{9} & -\frac{1}{9} & -\frac{1}{9} \end{bmatrix} \begin{bmatrix} \frac{1}{9} & \frac{1}{9} & \frac{1}{9} \\ 0 & 0 & 0 \\ -\frac{1}{9} & -\frac{1}{9} & -\frac{1}{9} \end{bmatrix} \begin{bmatrix} \frac{1}{9} & \frac{1}{9} & \frac{1}{9} \\ 0 & 0 & 0 \\ -\frac{1}{9} & -\frac{1}{9} & -\frac{1}{9} \end{bmatrix}$$

$$\mathbf{F}_y = \begin{bmatrix} \frac{1}{9} & 0 & -\frac{1}{9} \\ \frac{1}{9} & 0 & -\frac{1}{9} \\ \frac{1}{9} & 0 & -\frac{1}{9} \end{bmatrix} \begin{bmatrix} \frac{1}{9} & 0 & -\frac{1}{9} \\ \frac{1}{9} & 0 & -\frac{1}{9} \\ \frac{1}{9} & 0 & -\frac{1}{9} \end{bmatrix} \begin{bmatrix} \frac{1}{9} & 0 & -\frac{1}{9} \\ \frac{1}{9} & 0 & -\frac{1}{9} \\ \frac{1}{9} & 0 & -\frac{1}{9} \end{bmatrix}$$

$$\mathbf{F}_t = \begin{bmatrix} \frac{1}{9} & \frac{1}{9} & \frac{1}{9} \\ \frac{1}{9} & \frac{1}{9} & \frac{1}{9} \\ \frac{1}{9} & \frac{1}{9} & \frac{1}{9} \end{bmatrix} \begin{bmatrix} 0 & 0 & 0 \\ 0 & 0 & 0 \\ 0 & 0 & 0 \end{bmatrix} \begin{bmatrix} -\frac{1}{9} & -\frac{1}{9} & -\frac{1}{9} \\ -\frac{1}{9} & -\frac{1}{9} & -\frac{1}{9} \\ -\frac{1}{9} & -\frac{1}{9} & -\frac{1}{9} \end{bmatrix}$$

Fig. 2

VIDEO QUALITY OBJECTIVE ASSESSMENT METHOD BASED ON SPATIOTEMPORAL DOMAIN STRUCTURE

CROSS REFERENCE OF RELATED APPLICATION

The present invention claims priority under 35 U.S.C. 119(a-d) to CN 201610367702.2, filed May 27, 2016.

BACKGROUND OF THE PRESENT INVENTION

Field of Invention

The present invention relates to a video quality assessment method, and more particularly to a video quality objective assessment method based on a spatiotemporal domain structure.

Description of Related Arts

Video quality assessment (VQA for short) plays a key role in the rapid development of video-related applications, which is commonly used in quality control of a wide variety of video services and performance comparison of various video processing algorithms. Video quality objective assessment focuses on estimating the video quality by algorithms, so as to approximate the video quality perceived by human visual system. According to availability of original video without distortion, video quality objective assessment method is generally divided into three categories: full-reference (FR), reduced-reference and no-reference video quality assessment methods. Due to a higher accuracy, the full reference video quality assessment method (FR-VQA for short) is widely used in perceptual video processing such as encoding module selection, parameter quantization, rate control, and error concealment in video compression.

Full-reference video quality assessment method requires the ability to quickly and accurately evaluate the video objective quality, so real-time processing capability is very important, such as online source video quality monitoring and distortion metrics of rate-distortion optimized video encoder. Besides, in other applications, a low complexity is also a very important performance requirement for the full reference video quality assessment method. Pixel-level peak signal-to-noise ratio (PSNR for short) in the full-reference assessment method is conventionally the most widely used performance quantized indicator in video processing. Due to advantages such as convenient implement, fast evaluation, stable performance, and clear physical meaning, the peak signal-to-noise ratio is still the most widely used objective assessment method for most widely used video coding standard H.264/AVC and the latest H.265/HEVC. However, distortion of each pixel is treated equally without considering perceptual characteristics of the human visual system, which causes a low consistency between the peak signal-to-noise ratio and the subjective quality perception, thus impeding the progress of video processing technology, especially the progress of the video compression efficiency.

Conventional full-reference video quality assessment methods are divided into two categories. The first one, which is the most direct video quality assessment method, is to use effective image quality assessment method on independent frame, and then use average or weighted average for obtaining the video quality. However, such video quality assessment method lacks temporal information and assessment effect is poor. The second one respectively investigates spatial and temporal domains distortion for obtaining the video quality, or directly evaluates according to the spatial domain information. Although assessment effect of such method is better than that of the peak signal-to-noise ratio, complexity thereof is high and some need very time-consuming motion estimation. Therefore, disadvantages, such as difficult implement, impossible real-time processing and difficult integration, hinder the wide application of such video quality assessment method.

SUMMARY OF THE PRESENT INVENTION

An object of the present invention is to provide a video quality objective assessment method based on a spatiotemporal domain structure, which effectively improves relativity between objective assessment results and subjective perception, and lowers calculation complexity.

Accordingly, in order to accomplish the above object, the present invention provides a video quality objective assessment method based on a spatiotemporal domain structure, comprising steps of:

(1) marking a reference video sequence without distortion as $S_r$, and marking a distorted video sequence, which is obtained after the $S_r$ is distorted, as $S_d$; wherein a total $S_r$ frame quantity is F, a total $S_d$ frame quantity is also F, and F>1; widths of images in both the $S_r$ and the $S_d$ are W, and heights of the images in both the $S_r$ and the $S_d$ are H; defining an image luminance component sequence of the images in the $S_r$ as a luminance component sequence of the $S_r$ and marking as $Y_r$; defining a first image chrominance component sequence of the images in the $S_r$ as a first chrominance component sequence of the $S_r$ and marking as $U_r$; defining a second image chrominance component sequence of the images in the $S_r$ as a second chrominance component sequence of the $S_r$ and marking as $V_r$; defining an image luminance component sequence of the images in the $S_d$ as a luminance component sequence of the $S_d$ and marking as $Y_d$; defining a first image chrominance component sequence of the images in the $S_d$ as a first chrominance component sequence of the $S_d$ and marking as $U_d$; defining a second image chrominance component sequence of the images in the $S_d$ as a second chrominance component sequence of the $S_d$ and marking as $V_d$; wherein widths of images in the $Y_r$, the $U_r$, the $V_r$, the $Y_d$, the $U_d$ and the $V_d$ are W, and heights of the images in the $Y_r$, the $U_r$, the $V_r$, the $Y_d$, the $U_d$ and the $V_d$ are H;

(2) calculating a spatiotemporal domain gradient magnitude sequence of the $Y_r$ with a three-dimensional Prewitt operator and marking as $G_r$, and marking a pixel value of a pixel at a position of (x,y) in a number t frame in the $G_r$ as $G_r(x,y,t)$, wherein $$G_r(x, y, t) = \sqrt{(Y_{rx}(x, y, t))^2 + (Y_{ry}(x, y, t))^2 + (Y_{rt}(x, y, t))^2} \,,$$

$Y_{rx}=Y_r \otimes F_x$, $Y_{ry}=Y_r \otimes F_y$, $Y_{rt}=Y_r \otimes F_t$;

similarly, calculating a spatiotemporal domain gradient magnitude sequence of the $Y_d$ with the three-dimensional Prewitt operator and marking as $G_d$, and marking a pixel value of a pixel at a position of (x,y) in a number t frame in the $G_d$ as $G_d(x,y,t)$, wherein $$G_d(x, y, t) = \sqrt{(Y_{dx}(x, y, t))^2 + (Y_{dy}(x, y, t))^2 + (Y_{dt}(x, y, t))^2} \,,$$

$Y_{dx}=Y_d \otimes F_x$, $Y_{dy}=Y_d \otimes F_y$, $Y_{dt}=Y_d \otimes F_t$;

wherein an initial value of the t is 1, $1 \leq t \leq F$, $1 \leq x \leq W$, $1 \leq y \leq H$; $Y_{rx}(x,y,t)$ refers to a pixel value of a pixel at a position of (x,y) in a number t frame in a horizontal gradient magnitude sequence $Y_{rx}$ of the $Y_r$, $Y_{ry}(x,y,t)$ refers to a pixel value of a pixel at a position of (x,y) in a number t frame in a vertical gradient magnitude sequence $Y_{ry}$ of the $Y_r$, and $Y_{rt}(x,y,t)$ refers to a pixel value of a pixel at a position of (x,y) in a number t frame in a temporal gradient magnitude sequence $Y_{rt}$ of the $Y_r$; $Y_{dx}(x,y,t)$ refers to a pixel value of a pixel at a position of (x,y) in a number t frame in a horizontal gradient magnitude sequence $Y_{dx}$ of the $Y_d$, $Y_{dy}(x,y,t)$ refers to a pixel value of a pixel at a position of (x,y) in a number t frame in a vertical gradient magnitude sequence $Y_{dy}$ of the $Y_d$, and $Y_{dt}(x,y,t)$ refers to a pixel value of a pixel at a position of (x,y) in a number t frame in a temporal gradient magnitude sequence $Y_{dt}$ of the $Y_d$; a symbol $\otimes$ is a zeros truncated convolution symbol; after convolution, dimensions of the $Y_{rx}$, the $Y_{ry}$ and the $Y_{rt}$ are same as a dimension of the $Y_r$, and dimensions of the $Y_{dx}$, $Y_{dy}$ and $Y_{dt}$ are same as a dimension of the $Y_d$; $F_x$, $F_y$ and $F_t$ correspond to a horizontal mask, a vertical mask and a temporal mask of the three-dimensional Prewitt operator;

(3) calculating a spatiotemporal domain local gradient similarity between each pixel point in each frame in the $S_r$ and a corresponding pixel point in a corresponding frame in the $S_d$; marking the spatiotemporal domain local gradient similarity between a pixel point at a position of (x,y) in a number t frame in the $S_r$ and a pixel point at a position of (x,y) in a number t frame in the $S_d$ as $G_{sim}(x,y,t)$; wherein $$G_{sim}(x, y, t) = \frac{2G_r(x, y, t) \times G_d(x, y, t) + c_1}{(G_r(x, y, t))^2 + (G_d(x, y, t))^2 + c_1},$$

$c_1$ is a positive constant preventing the fractional from being meaningless;

(4) calculating a spatiotemporal domain local color similarity between each pixel point in each frame in the $S_r$ and the corresponding pixel point in the corresponding frame in the $S_d$; marking the spatiotemporal domain local color similarity between the pixel point at the position of (x,y) in the number t frame in the $S_r$ and the pixel point at the position of (x,y) in the number t frame in the $S_d$ as $C_{sim}(x,y,t)$; wherein $$C_{sim}(x, y, t) = \frac{2U_r(x, y, t) \times U_d(x, y, t) + c_2}{(U_r(x, y, t))^2 + (U_d(x, y, t))^2 + c_2} \times \frac{2V_r(x, y, t) \times V_d(x, y, t) + c_3}{(V_r(x, y, t))^2 + (V_d(x, y, t))^2 + c_3},$$

$U_r(x,y,t)$ refers to a pixel value of a pixel point at a position of (x,y) in a number t frame in the $U_r$, which is also a pixel value of a pixel point at a position of (x,y) in a first chrominance component in a number t frame in the $S_r$; $V_r(x,y,t)$ refers to a pixel value of a pixel point at a position of (x,y) in a number t frame in the $V_r$, which is also a pixel value of a pixel point at a position of (x,y) in a second chrominance component in a number t frame in the $S_r$; $U_d(x,y,t)$ refers to a pixel value of a pixel point at a position of (x,y) in a number t frame in the $U_d$, which is also a pixel value of a pixel point at a position of (x,y) in a first chrominance component in a number t frame in the $S_d$; $V_d(x,y,t)$ refers to a pixel value of a pixel point at a position of (x,y) in a number t frame in the $V_d$, which is also a pixel value of a pixel point at a position of (x,y) in a second chrominance component in a number t frame in the $S_d$; $c_2$ and $c_3$ are positive constants preventing the fractional from being meaningless;

(5) calculating a spatiotemporal domain local similarity between each pixel point in each frame in the $S_r$ and the corresponding pixel point in the corresponding frame in the $S_d$ according to the spatiotemporal domain local gradient similarity between each pixel point in each frame in the $S_r$ and the corresponding pixel point in the corresponding frame in the $S_d$, and the spatiotemporal domain local color similarity between each pixel point in each frame in the $S_r$ and the corresponding pixel point in the corresponding frame in the $S_d$; marking the spatiotemporal domain local similarity between the pixel point at the position of (x,y) in the number t frame in the $S_r$ and the pixel point at the position of (x,y) in the number t frame in the $S_d$ as $Q_{LS}(x,y,t)$, wherein $Q_{LS}(x,y,t) = G_{sim}(x,y,t) \times (C_{sim}(x,y,t))^\lambda$, $\lambda$ is used for adjusting weights of color components, $\lambda > 0$;

(6) calculating an objective quality value of each frame in the $S_d$ with a variance fusion method, and marking the objective quality value of the number t frame in the $S_d$ as $Q_{frame}(t)$, wherein $$Q_{frame}(t) = \sqrt{\frac{1}{W \times H} \sum_{x=1}^{W} \sum_{y=1}^{H} (Q_{LS}(x, y, t) - Q_{mean}(t))^2},$$

$Q_{mean}(t)$ refers to an average value of the spatiotemporal domain local similarity between all pixel points in the number t frame in the $S_r$ and all pixel points in the number t frame in the $S_d$, $$Q_{mean}(t) = \frac{1}{W \times H} \sum_{x=1}^{W} \sum_{y=1}^{H} Q_{LS}(x, y, t);$$

and (7) calculating an objective quality value of the $S_d$ with a temporal domain weighting method and marking as Q, wherein $$Q = \frac{1}{F} \sum_{t=1}^{F} (Q_{LP}(t) \times \log(\gamma \times t + 1)),$$

$$Q_{LP}(t) = \begin{cases} Q_{frame}(t), \text{ if } t = 1 \\ Q_{LP}(t-1) + \alpha \times \Delta Q_{frame}(t), \text{ if } 2 \leq t \leq F \text{ and } \Delta Q_{frame}(t) \leq 0, \\ Q_{LP}(t-1) + \beta \times \Delta Q_{frame}(t), \text{ if } 2 \leq t \leq F \text{ and } \Delta Q_{frame}(t) > 0 \end{cases}$$

$\Delta Q_{frame}(t) = Q_{frame}(t) - Q_{LP}(t-1)$, $\alpha$ refers to a weight during quality increase and $\beta$ refers to a weight during quality decrease, $\gamma$ is used to adjust a strength of a recency effect.

In the step (3), $\lambda = 3$.

In the step (7), $\alpha = 0.03$, $\beta = 0.2$, $\gamma = 1000$.

Compared with conventional technologies, the present invention has advantages as follows.

1) Spatiotemporal domain gradient is able to reflect both spatial and temporal distortions, and color information in the video quality assessment is very important. The method of the present invention combines the spatiotemporal domain gradient magnitude and the color information for calculating the spatiotemporal domain local similarity between each pixel point in each frame in the reference video sequence without distortion and the corresponding pixel point in the corresponding frame in the distorted video sequence, and reflects the spatial and the temporal distortions at the same time with such bottom features, avoiding a widely used method which is based on motion estimation. Therefore, the present invention is accurate and fast.

2) According to the present invention, spatial domain fusion is provided by variance fusion. The spatiotemporal domain local similarity is fused into frame-level objective quality value, and then a temporal domain fusion model is established to fuse the frame-level objective quality values by simulating three important global temporal effects, which are a smoothing effect, an asymmetric track effects and a recency effect, of a human visual system. Finally, the objective quality values of the distorted video sequence are obtained. By modeling the human visual temporal domain effect, the temporal domain weighting method of the present invention is able to accurately and efficiently evaluate the objective quality of the distorted video.

3) During measuring the temporal domain distortion, the present invention firstly reflects local temporal domain distortion through the spatiotemporal domain local gradient similarity, then processes local temporal domain distortions with global integration through weighting by simulating the global temporal effect during temporal domain fusion, so as to avoid widely used temporal domain distortion assessment with motion vectors, and avoid time-consuming motion estimation, which ensures efficiency and low computational complexity of the present invention.

These and other objectives, features, and advantages of the present invention will become apparent from the following detailed description, the accompanying drawings, and the appended claims.

BRIEF DESCRIPTION OF THE DRAWINGS

FIG. 2 illustrates a horizontal mask, a vertical mask and a temporal mask of a three-dimensional Prewitt operator.

DETAILED DESCRIPTION OF THE PREFERRED EMBODIMENT

Figure 1:
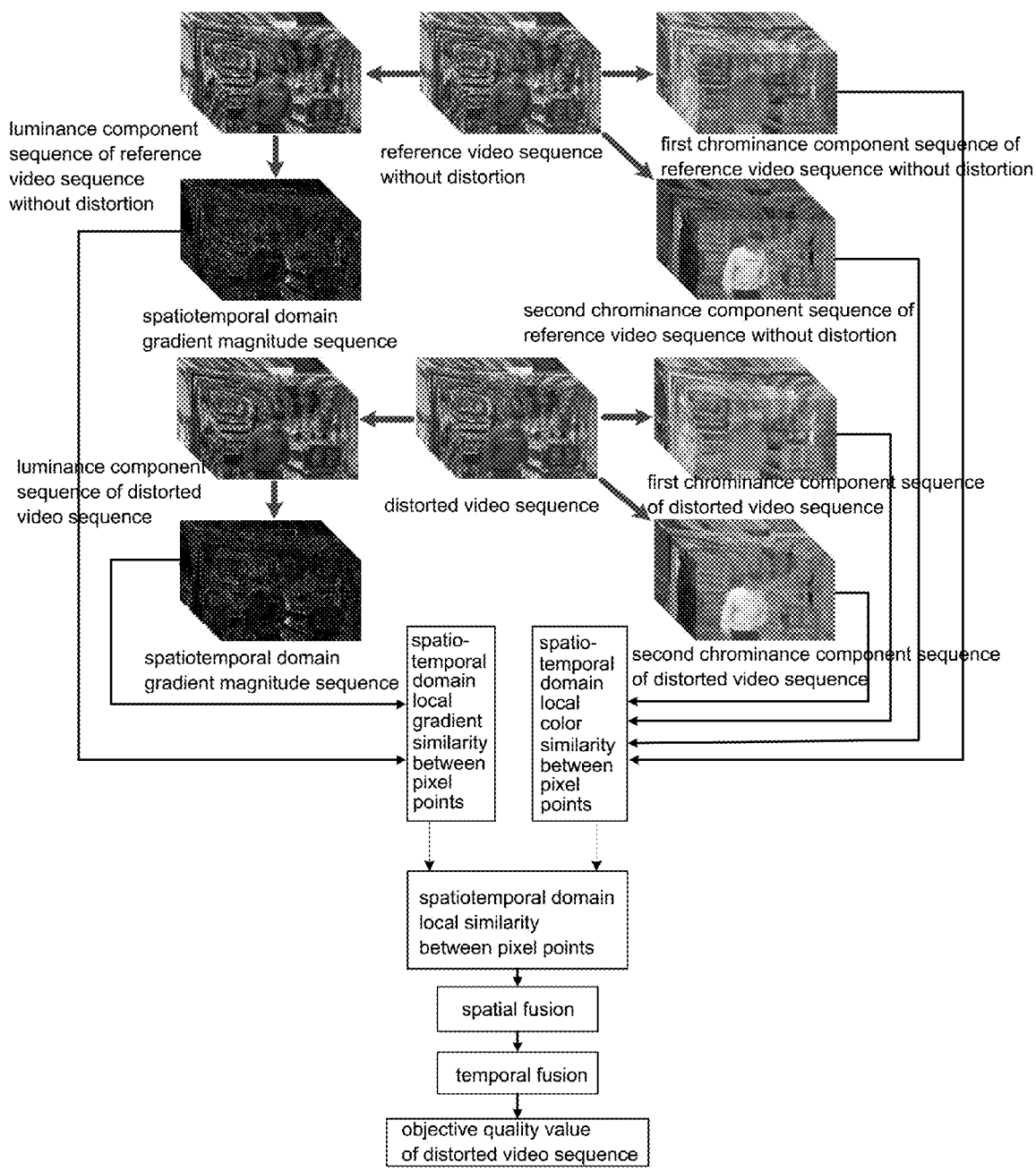
FIG. 1 is an overall flow chart of the present invention.

Referring to drawings and a preferred embodiment, the present invention is further illustrated.

Outstanding full-reference video quality assessment methods not only are highly accurate in prediction and sensitive to both spatial and temporal distortions, but also lower a computational complexity as much as possible and provide real-time processing of video sequences. The present invention combines a spatiotemporal domain gradient magnitude and color information for calculating a spatiotemporal domain local similarity, and then treats a whole video sequence as a dynamic temporal sequence. Firstly, frame-level objective quality value of each frame is obtained by variance fusion, then a temporal domain fusion model is established by simulating three important global temporal effects, which are a smoothing effect, an asymmetric track effects and a recency effect, of a human visual system, so as to obtain objective quality values of a distorted video sequence. Bottom feature calculation is simple and sensitive to both temporal and spatial distortions, and the temporal domain fusion model analogs a temporal domain effect for ensuring accuracy and efficiency of the present invention.

The present invention provides a video quality objective assessment method based on a spatiotemporal domain structure, whose overall flow chart is shown in FIG. 1. The video quality objective assessment method comprises steps of:

(1) marking a reference video sequence without distortion as $S_r$, and marking a distorted video sequence, which is obtained after the $S_r$ is distorted, as $S_d$; wherein a total $S_r$ frame quantity is F, a total $S_d$ frame quantity is also F, and F>1; widths of images in both the $S_r$ and the $S_d$ are W, and heights of the images in both the $S_r$ and the $S_d$ are H; defining an image luminance component sequence of the images in the $S_r$ as a luminance component sequence of the $S_r$ and marking as $Y_r$; defining a first image chrominance component sequence of the images in the $S_r$ as a first chrominance component sequence of the $S_r$ and marking as $U_r$; defining a second image chrominance component sequence of the images in the $S_r$ as a second chrominance component sequence of the $S_r$ and marking as $V_r$; defining an image luminance component sequence of the images in the $S_d$ as a luminance component sequence of the $S_d$ and marking as $Y_d$; defining a first image chrominance component sequence of the images in the $S_d$ as a first chrominance component sequence of the $S_d$ and marking as $U_d$; defining a second image chrominance component sequence of the images in the $S_d$ as a second chrominance component sequence of the $S_d$ and marking as $V_d$; wherein widths of images in the $Y_r$, the $U_r$, the $V_r$, the $Y_d$, the $U_d$ and the $V_d$ are W, and heights of the images in the $Y_r$, the $U_r$, the $V_r$, the $Y_d$, the $U_d$ and the $V_d$ are H;

(2) calculating a spatiotemporal domain gradient magnitude sequence of the $Y_r$ with a three-dimensional Prewitt operator and marking as $G_r$, and marking a pixel value of a pixel at a position of (x,y) in a number t frame in the $G_r$ as $G_r(x,y,t)$, wherein $$G_r(x, y, t) = \sqrt{(Y_{rx}(x, y, t))^2 + (Y_{ry}(x, y, t))^2 + (Y_{rt}(x, y, t))^2},$$

$Y_{rx}=Y_r \otimes F_x$, $Y_{ry}=Y_r \otimes F_y$, $Y_{rt}=Y_r \otimes F_t$;

similarly, calculating a spatiotemporal domain gradient magnitude sequence of the $Y_d$ with the three-dimensional Prewitt operator and marking as $G_d$, and marking a pixel value of a pixel at a position of (x,y) in a number t frame in the $G_d$ as $G_d(x,y,t)$, wherein $$G_d(x, y, t) = \sqrt{(Y_{dx}(x, y, t))^2 + (Y_{dy}(x, y, t))^2 + (Y_{dt}(x, y, t))^2},$$

$Y_{dx}=Y_d \otimes F_x$, $Y_{dy}=Y_d \otimes F_y$, $Y_{dt}=Y_d \otimes F_t$;

wherein an initial value of the t is 1, $1 \le t \le F$, $1 \le x \le W$, $1 \le y \le H$; $Y_{rx}(x,y,t)$ refers to a pixel value of a pixel at a position of (x,y) in a number t frame in a horizontal gradient magnitude sequence $Y_{rx}$ of the $Y_r$, $Y_{ry}(x,y,t)$ refers to a pixel value of a pixel at a position of (x,y) in a number t frame in a vertical gradient magnitude sequence $Y_{ry}$ of the $Y_r$, and $Y_{rt}(x,y,t)$ refers to a pixel value of a pixel at a position of (x,y) in a number t frame in a temporal gradient magnitude sequence $Y_{rt}$ of the $Y_r$; $Y_{dx}(x,y,t)$ refers to a pixel value of a pixel at a position of (x,y) in a number t frame in a horizontal gradient magnitude sequence $Y_{dx}$ of the $Y_d$, $Y_{dy}(x,y,t)$ refers to a pixel value of a pixel at a position of (x,y) in a number t frame in a vertical gradient magnitude sequence $Y_{dy}$ of the $Y_d$, and $Y_{dt}(x,y,t)$ refers to a pixel value of a pixel at a position of (x,y) in a number t frame in a temporal gradient magnitude sequence $Y_{dt}$ of the $Y_d$; a symbol $\hat{\otimes}$ is a zeros truncated convolution symbol; after convolution, dimensions of the $Y_{rx}$, the $Y_{ry}$ and the $Y_{rt}$ are same as a dimension of the $Y_r$, and dimensions of the $Y_{dx}$, $Y_{dy}$ and $Y_{dt}$ are same as a dimension of the $Y_d$; $F_x$, $F_y$ and $F_t$ correspond to a horizontal mask, a vertical mask and a temporal mask of the three-dimensional Prewitt operator; the $F_x$, the $F_y$ and the $F_t$ are shown in FIG. 2, and the three-dimensional Prewitt operator is available based on a two-dimensional Prewitt operator through conventional methods;

(3) calculating a spatiotemporal domain local gradient similarity between each pixel point in each frame in the $S_r$ and a corresponding pixel point in a corresponding frame in the $S_d$; marking the spatiotemporal domain local gradient similarity between a pixel point at a position of (x,y) in a number t frame in the $S_r$ and a pixel point at a position of (x,y) in a number t frame in the $S_d$ as $G_{sim}(x,y,t)$; wherein $$G_{sim}(x, y, t) = \frac{2G_r(x, y, t) \times G_d(x, y, t) + c_1}{(G_r(x, y, t))^2 + (G_d(x, y, t))^2 + c_1},$$

$c_1$ is a positive constant preventing the fractional from being meaningless; according the preferred embodiment, $c_1=90$;

(4) calculating a spatiotemporal domain local color similarity between each pixel point in each frame in the $S_r$ and the corresponding pixel point in the corresponding frame in the $S_d$; marking the spatiotemporal domain local color similarity between the pixel point at the position of (x,y) in the number t frame in the $S_r$ and the pixel point at the position of (x,y) in the number t frame in the $S_d$ as $C_{sim}(x,y,t)$; wherein $$C_{sim}(x, y, t) = \frac{2U_r(x, y, t) \times U_d(x, y, t) + c_2}{(U_r(x, y, t))^2 + (U_d(x, y, t))^2 + c_2} \times \frac{2V_r(x, y, t) \times V_d(x, y, t) + c_3}{(V_r(x, y, t))^2 + (V_d(x, y, t))^2 + c_3},$$

$U_r(x,y,t)$ refers to a pixel value of a pixel point at a position of (x,y) in a number t frame in the $U_r$, which is also a pixel value of a pixel point at a position of (x,y) in a first chrominance component in a number t frame in the $S_r$; $V_r(x,y,t)$ refers to a pixel value of a pixel point at a position of (x,y) in a number t frame in the $V_r$, which is also a pixel value of a pixel point at a position of (x,y) in a second chrominance component in a number t frame in the $S_r$; $U_d(x,y,t)$ refers to a pixel value of a pixel point at a position of (x,y) in a number t frame in the $U_d$, which is also a pixel value of a pixel point at a position of (x,y) in a first chrominance component in a number t frame in the $S_d$; $V_d(x,y,t)$ refers to a pixel value of a pixel point at a position of (x,y) in a number t frame in the $V_d$, which is also a pixel value of a pixel point at a position of (x,y) in a second chrominance component in a number t frame in the $S_d$; $c_2$ and $c_3$ are positive constants preventing the fractional from being meaningless; according to the preferred embodiment, $c_2=c_3=300$;

(5) calculating a spatiotemporal domain local similarity between each pixel point in each frame in the $S_r$ and the corresponding pixel point in the corresponding frame in the $S_d$ according to the spatiotemporal domain local gradient similarity between each pixel point in each frame in the $S_r$ and the corresponding pixel point in the corresponding frame in the $S_d$, and the spatiotemporal domain local color similarity between each pixel point in each frame in the $S_r$ and the corresponding pixel point in the corresponding frame in the $S_d$; marking the spatiotemporal domain local similarity between the pixel point at the position of (x,y) in the number t frame in the $S_r$ and the pixel point at the position of (x,y) in the number t frame in the $S_d$ as $Q_{LS}(x,y,t)$, wherein $Q_{LS}(x,y,t)=G_{sim}(x,y,t)\times(C_{sim}(x,y,t))^\lambda$, $\lambda$ is used for adjusting weights of color components, $\lambda>0$; according to the preferred embodiment, $\lambda=3$;

(6) calculating an objective quality value of each frame in the $S_d$ with a variance fusion method, and marking the objective quality value of the number t frame in the $S_d$ as $Q_{frame}(t)$, wherein $$Q_{frame}(t) = \sqrt{\frac{1}{W \times H}\sum_{x=1}^{W}\sum_{y=1}^{H}(Q_{LS}(x, y, t) - Q_{mean}(t))^2},$$

$Q_{mean}(t)$ refers to an average value of the spatiotemporal domain local similarity between all pixel points in the number t frame in the $S_r$ and all pixel points in the number t frame in the $S_d$, $$Q_{mean}(t) = \frac{1}{W \times H}\sum_{x=1}^{W}\sum_{y=1}^{H}Q_{LS}(x, y, t);$$

and (7) calculating an objective quality value of the $S_d$ with a temporal domain weighting method and marking as Q, wherein $$Q = \frac{1}{F}\sum_{t=1}^{F}(Q_{LP}(t) \times \log(\gamma \times t + 1)),$$

$$Q_{LP}(t) = \begin{cases} Q_{frame}(t), & \text{if } t=1 \\ Q_{LP}(t-1) + \alpha \times \Delta Q_{frame}(t), & \text{if } 2 \le t \le F \text{ and } \Delta Q_{frame}(t) \le 0, \\ Q_{LP}(t-1) + \beta \times \Delta Q_{frame}(t), & \text{if } 2 \le t \le F \text{ and } \Delta Q_{frame}(t) > 0 \end{cases}$$

$\Delta Q_{frame}(t)=Q_{frame}(t)-Q_{LP}(t-1)$, $\alpha$ refers to a weight during quality increase and $\beta$ refers to a weight during quality decrease, $\gamma$ is used to adjust a strength of a recency effect; according to the preferred embodiment, $\alpha=0.03$, $\beta=0.2$, $\gamma=1000$.

For illustrating feasibility and effectiveness, the present invention is tested as follows.

A LIVE video database and a CSIQ video database are used. Referring to the LIVE video database, there are 10 video segments without distortion; four distortion types are involved, which are MPEG-2 compression distortion, H.264 compression distortion, transmission distortion of bit-stream compressed with H.264 standard through IP network, and transmission distortion through wireless network; there are totally 150 segments of distorted videos which are all YUV420 format with a resolution of 768×432 and a length of 10 seconds; and two frame rates, 25 frames per second and 50 frames per second, are used. Referring to the CSIQ video database, there are 12 video segments without distortion; six distortion types are involved, which are motion JPEG compression distortion, H.264 compression distortion, HEVC compression distortion, wavelet compression distortion, loss distortion of wireless transmission, and additive white Gaussian noise distortion; there are totally 216 segments of distorted videos which are all YUV420 format with a resolution of 832×480 and a length of 10 seconds; and five frame rates, 24 frames per second, 25 frames per second, 30 frames per second, 50 frames per second and 60 frames per second, are used. Both the LIVE video database and the CSIQ video database provide average subjective opinion scores of each distorted video. Since two chrominance components are both ¼ of a luminance component in the YUV420 format, the luminance component is processed with 2×2 mean filter in the spatial domain and down-sampling by a factor of 2, so as to matching dimensions of luminance component and chrominance components. Then the steps (1) to (7) are executed, and objective quality values of all distorted videos are calculated in a same way. For other formats such as YUV444 and YUYV, since the present invention requires that the dimension of the luminance component equal to the dimensions of the first chrominance component and the second chrominance component, down-sampling or up-sampling is also needed, so as to matching dimensions of the luminance component and the first as well as the second chrominance components. According to the present invention, in each treated video, sizes of all frames are equal.

Three common objective parameters of the video quality assessment method are used as evaluation criteria, which are Pearson linear correlation coefficient (PLCC), Spearman rank order correlation coefficient (SROCC) and rooted mean squared error (RMSE). Valve ranges of PLCC and SROCC are [0,1], wherein if a value is closer to 1, the assessment method is better; otherwise, the assessment method is worse. If a RMSE value is smaller, the assessment method is better; otherwise, the assessment method is worse. The PLCC, the SROCC and the RMSE values indicating assessment performances of the LIVE video database are shown in a Table 1, and the PLCC, the SROCC and the RMSE values indicating assessment performances of the CSIQ video database are shown in a Table 2. Referring to Table 1, values of the PLCC and the SROCC are higher than 0.84. Referring to Table 2, values of the PLCC and the SROCC are higher than 0.80. That is to say, with the present invention, the objective quality values calculated is highly related to the average subjective opinion scores, indicating that objective assessment results are relatively consistent with subjective perception of human eyes, which illustrates the effectiveness the present invention.

TABLE 1 relativity between objective quality values of distorted videos obtained by the present invention and average subjective opinion scores for LIVE video database

|  | MPEG-2 compression distortion | H.264 compression distortion | transmission distortion of H.264 compressed bit flow through IP network | transmission distortion through wireless network | all distorted videos |
|---|---|---|---|---|---|
| PLCC | 0.9115 | 0.8260 | 0.8401 | 0.8816 | 0.8632 |
| SROCC | 0.9122 | 0.7660 | 0.8126 | 0.8332 | 0.8475 |
| RMSE | 4.6162 | 6.3169 | 5.4474 | 5.3174 | 5.5439 |

TABLE 2 relativity between objective quality values of distorted videos obtained by the present invention and average subjective opinion scores for CSIQ video database

|  | motion JPEG compression distortion | H.264 compression distortion | HEVC compression distortion | wavelet compression distortion | loss distortion of wireless transmission | additive white Gaussian noise distortion | all distorted videos |
|---|---|---|---|---|---|---|---|
| PLCC | 0.9366 | 0.7976 | 0.8590 | 0.8748 | 0.9030 | 0.9586 | 0.8099 |
| SROCC | 0.9331 | 0.7985 | 0.8474 | 0.8440 | 0.8723 | 0.9416 | 0.8302 |
| RMSE | 6.9568 | 6.3461 | 7.6241 | 7.3420 | 4.6853 | 6.4334 | 9.7535 |

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A video quality objective assessment method based on a spatiotemporal domain structure, comprising steps of:
  (1) marking a reference video sequence without distortion as $S_r$, and marking a distorted video sequence, which is obtained after the $S_r$ is distorted, as $S_d$; wherein a total $S_r$ frame quantity is F, a total $S_d$ frame quantity is also F, and F>1; widths of images in both the $S_r$ and the $S_d$ are W, and heights of the images in both the $S_r$ and the $S_d$ are H; defining an image luminance component sequence of the images in the $S_r$ as a luminance component sequence of the $S_r$ and marking as $Y_r$; defining a first image chrominance component sequence of the images in the $S_r$ as a first chrominance component sequence of the $S_r$ and marking as $U_r$; defining a second image chrominance component sequence of the images in the $S_r$ as a second chrominance component sequence of the $S_r$ and marking as $V_r$; defining an image luminance component sequence of the images in the $S_d$ as a luminance component sequence of the $S_d$ and marking as $Y_d$; defining a first image chrominance component sequence of the images in the $S_d$ as a first chrominance component sequence of the $S_d$ and marking as $U_d$; defining a second image chrominance component sequence of the images in the $S_d$ as a second chrominance component sequence of the $S_d$ and marking as $V_d$; wherein widths of images in the $Y_r$, the $U_r$, the $V_r$, the $Y_d$, the $U_d$ and the $V_d$ are W, and heights of the images in the $Y_r$, the $U_r$, the $V_r$, the $Y_d$, the $U_d$ and the $V_d$ are H;

(2) calculating a spatiotemporal domain gradient magnitude sequence of the $Y_r$ with a three-dimensional Prewitt operator and marking as $G_r$, and marking a pixel value of a pixel at a position of (x,y) in a number t frame in the $G_r$ as $G_r(x,y,t)$, wherein $$G_r(x, y, t) = \sqrt{(Y_{rx}(x, y, t))^2 + (Y_{ry}(x, y, t))^2 + (Y_{rt}(x, y, t))^2},$$

$Y_{rx}=Y_r \otimes F_x$, $Y_{ry}=Y_r \otimes F_y$, $Y_{rt}=Y_r \otimes F_t$, similarly, calculating a spatiotemporal domain gradient magnitude sequence of the $Y_d$ with the three-dimensional Prewitt operator and marking as $G_d$, and marking a pixel value of a pixel at a position of (x,y) in a number t frame in the $G_d$ as $G_d(x,y,t)$, wherein $$G_d(x, y, t) = \sqrt{(Y_{dx}(x, y, t))^2 + (Y_{dy}(x, y, t))^2 + (Y_{dt}(x, y, t))^2},$$

$Y_{dx}=Y_d \otimes F_x$, $Y_{dy}=Y_d \otimes F_y$, $Y_{dt}=Y_d \otimes F_t$;

wherein an initial value of the t is 1, $1 \le t \le F$, $1 \le x \le W$, $1 \le y \le H$; $Y_{rx}(x,y,t)$ refers to a pixel value of a pixel at a position of (x,y) in a number t frame in a horizontal gradient magnitude sequence $Y_{rx}$ of the $Y_r$, $Y_{ry}(x,y,t)$ refers to a pixel value of a pixel at a position of (x,y) in a number t frame in a vertical gradient magnitude sequence $Y_{ry}$ of the $Y_r$, and $Yr_{rt}(x,y,t)$ refers to a pixel value of a pixel at a position of (x,y) in a number t frame in a temporal gradient magnitude sequence $Y_{rt}$ of the $Y_r$; $Y_{dx}(x,y,t)$ refers to a pixel value of a pixel at a position of (x,y) in a number t frame in a horizontal gradient magnitude sequence $Y_{dx}$ of the $Y_d$, $Y_{dy}(x,y,t)$ refers to a pixel value of a pixel at a position of (x,y) in a number t frame in a vertical gradient magnitude sequence $Y_{dy}$ of the $Y_d$, and $Y_{dt}(x,y,t)$ refers to a pixel value of a pixel at a position of (x,y) in a number t frame in a temporal gradient magnitude sequence $Y_{dt}$ of the $Y_d$; a symbol $\otimes$ is a zeros truncated convolution symbol; after convolution, dimensions of the $Y_{rx}$, the $Y_{ry}$ and the $Y_{rt}$ are same as a dimension of the $Y_r$, and dimensions of the $Y_{dx}$, $Y_{dy}$ and $Y_{dt}$ are same as a dimension of the $Y_d$; $F_x$, $F_y$ and $F_t$ correspond to a horizontal mask, a vertical mask and a temporal mask of the three-dimensional Prewitt operator;

(3) calculating a spatiotemporal domain local gradient similarity between each pixel point in each frame in the $S_r$ and a corresponding pixel point in a corresponding frame in the $S_d$; marking the spatiotemporal domain local gradient similarity between a pixel point at a position of (x,y) in a number t frame in the $S_r$ and a pixel point at a position of (x,y) in a number t frame in the $S_d$ as $G_{sim}(x,y,t)$; wherein $$G_{sim}(x, y, t) = \frac{2G_r(x, y, t) \times G_d(x, y, t) + c_1}{(G_r(x, y, t))^2 + (G_d(x, y, t))^2 + c_1},$$

$c_1$ is a positive constant preventing the fractional from being meaningless;

(4) calculating a spatiotemporal domain local color similarity between each pixel point in each frame in the $S_r$ and the corresponding pixel point in the corresponding frame in the $S_d$; marking the spatiotemporal domain local color similarity between the pixel point at the position of (x,y) in the number t frame in the $S_r$ and the pixel point at the position of (x,y) in the number t frame in the $S_d$ as $C_{sim}(x,y,t)$; wherein $$C_{sim}(x, y, t) = \frac{2U_r(x, y, t) \times U_d(x, y, t) + c_2}{(U_r(x, y, t))^2 + (U_d(x, y, t))^2 + c_2} \times \frac{2V_r(x, y, t) \times V_d(x, y, t) + c_3}{(V_r(x, y, t))^2 + (V_d(x, y, t))^2 + c_3},$$

$U_r(x,y,t)$ refers to a pixel value of a pixel point at a position of (x,y) in a number t frame in the $U_r$, which is also a pixel value of a pixel point at a position of (x,y) in a first chrominance component in a number t frame in the $S_r$; $V_r(x,y,t)$ refers to a pixel value of a pixel point at a position of (x,y) in a number t frame in the $V_r$, which is also a pixel value of a pixel point at a position of (x,y) in a second chrominance component in a number t frame in the $S_r$; $U_d(x,y,t)$ refers to a pixel value of a pixel point at a position of (x,y) in a number t frame in the $U_d$, which is also a pixel value of a pixel point at a position of (x,y) in a first chrominance component in a number t frame in the $S_d$; $V_d(x,y,t)$ refers to a pixel value of a pixel point at a position of (x,y) in a number t frame in the $V_d$, which is also a pixel value of a pixel point at a position of (x,y) in a second chrominance component in a number t frame in the $S_d$; $c_2$ and $c_3$ are positive constants preventing the fractional from being meaningless;

(5) calculating a spatiotemporal domain local similarity between each pixel point in each frame in the $S_r$ and the corresponding pixel point in the corresponding frame in the $S_d$ according to the spatiotemporal domain local gradient similarity between each pixel point in each frame in the $S_r$ and the corresponding pixel point in the corresponding frame in the $S_d$, and the spatiotemporal domain local color similarity between each pixel point in each frame in the $S_r$ and the corresponding pixel point in the corresponding frame in the $S_d$; marking the spatiotemporal domain local similarity between the pixel point at the position of (x,y) in the number t frame in the $S_r$ and the pixel point at the position of (x,y) in the number t frame in the $S_d$ as $Q_{LS}(x,y,t)$, wherein $Q_{LS}(x,y,t)=G_{sim}(x,y,t) \times (C_{sim}(x,y,t))^\lambda$, $\lambda$ is used for adjusting weights of color components, $\lambda > 0$;

(6) calculating an objective quality value of each frame in the $S_d$ with a variance fusion method, and marking the objective quality value of the number t frame in the $S_d$ as $Q_{frame}(t)$, wherein $$Q_{frame}(t) = \sqrt{\frac{1}{W \times H} \sum_{x=1}^{W} \sum_{y=1}^{H} (Q_{LS}(x, y, t) - Q_{mean}(t))^2},$$

$Q_{mean}(t)$ refers to an average value of the spatiotemporal domain local similarity between all pixel points in the number t frame in the $S_r$ and all pixel points in the number t frame in the $$S_d, Q_{mean}(t) = \frac{1}{W \times H} \sum_{x=1}^{W} \sum_{y=1}^{H} Q_{LS}(x, y, t);$$

and
(7) calculating an objective quality value of the $S_d$ with a temporal domain weighting method and marking as Q, wherein $$Q = \frac{1}{F}\sum_{t=1}^{F}(Q_{LP}(t)\times \log(\gamma + t + 1)),$$

$$Q_{LP}(t) = \begin{cases} Q_{frame}(t), & \text{if } t = 1 \\ Q_{LP}(t-1) + \alpha \times \Delta Q_{frame}(t), & \text{if } 2 \leq t \leq F \text{ and } \Delta Q_{frame}(t) \leq 0, \\ Q_{LP}(t-1) + \beta \times \Delta Q_{frame}(t), & \text{if } 2 \leq t \leq F \text{ and } \Delta Q_{frame}(t) > 0 \end{cases}$$

$\Delta Q_{frame}(t) = Q_{frame}(t) - Q_{LP}(t-1)$, $\alpha$ refers to a weight during quality increase and $\beta$ refers to a weight during quality decrease, $\gamma$ is used to adjust a strength of a recency effect.

2. The video quality objective assessment method, as recited in claim 1, wherein in the step (3), $\lambda=3$.

3. The video quality objective assessment method, as recited in claim 1, wherein in the step (7), $\alpha=0.03$, $\beta=0.2$, $\gamma=1000$.

\* \* \* \* \*